(12) United States Patent
Amundsen

(10) Patent No.: US 8,736,764 B2
(45) Date of Patent: May 27, 2014

(54) METHOD, NAVIGATION AND DISPLAY SYSTEM FOR WIDGETS ON INTERNET-ENABLED DEVICES

(76) Inventor: Harald Amundsen, Vikhammer (NO)

( * ) Notice: Subject to any disclaimer, the term of this patent is extended or adjusted under 35 U.S.C. 154(b) by 0 days.

(21) Appl. No.: 13/504,193

(22) PCT Filed: Sep. 15, 2010

(86) PCT No.: PCT/NO2010/000337
§ 371 (c)(1),
(2), (4) Date: Jun. 20, 2012

(87) PCT Pub. No.: WO2011/059335
PCT Pub. Date: May 19, 2011

(65) Prior Publication Data
US 2012/0257110 A1 Oct. 11, 2012

(30) Foreign Application Priority Data
Nov. 11, 2009 (NO) .................................... 20093318

(51) Int. Cl.
*H04N 5/445* (2011.01)
*H04N 5/50* (2006.01)
*H04N 11/00* (2006.01)
*G06F 3/00* (2006.01)

(52) U.S. Cl.
USPC ........... 348/564; 348/552; 348/569; 715/718; 715/805; 715/804

(58) Field of Classification Search
USPC ......... 348/552, 564, 553, 554, 569, 570, 565; 715/718, 719, 764, 795, 796, 804, 835, 715/838, 846, 977, 805
See application file for complete search history.

(56) References Cited

U.S. PATENT DOCUMENTS

| | | |
|---|---|---|
| 2002/0196268 A1 | 12/2002 | Wolff et al. |
| 2004/0103439 A1 | 5/2004 | Macrae et al. |
| 2005/0097622 A1 | 5/2005 | Zigmond et al. |
| 2008/0120547 A1 | 5/2008 | Cho |
| 2008/0244681 A1 | 10/2008 | Gossweiler et al. |
| 2009/0100361 A1* | 4/2009 | Abello et al. .................. 715/764 |
| 2009/0172746 A1 | 7/2009 | Aldrey et al. |
| 2010/0011394 A1 | 1/2010 | Lee et al. |
| 2010/0169155 A1 | 7/2010 | Loi |
| 2010/0229197 A1 | 9/2010 | Yi et al. |
| 2010/0242077 A1 | 9/2010 | Kota et al. |
| 2011/0078715 A1* | 3/2011 | Chung et al. ...................... 725/9 |

FOREIGN PATENT DOCUMENTS

| | | |
|---|---|---|
| CA | 2 622 900 | 3/2007 |
| WO | WO 2009/063441 | 5/2009 |
| WO | WO 2009057950 A2 * | 5/2009 |

* cited by examiner

*Primary Examiner* — Michael Lee
(74) *Attorney, Agent, or Firm* — Ladas & Parry LLP

(57) ABSTRACT

System for providing widgets on a display of a TV unit, which TV unit is provided with an internal or external Internet-enabled device which provides Internet to the TV unit, and the system includes an internal or external control device for controlling the TV unit. The Internet-enabled device is arranged for providing widgets on the display of the TV unit together with a normal TV-sending or other programs, videos, or similar, a TV-viewer desires to watch. The invention also includes a method for the same.

13 Claims, 5 Drawing Sheets

METHOD, NAVIGATION AND DISPLAY SYSTEM FOR WIDGETS ON INTERNET-ENABLED DEVICES

This application is a 371 of PCT/NO2010/000337, filed on Sep. 15, 2010, which claims priority to Norwegian patent application number 20093318, filed Nov. 11, 2009, which is incorporated herein by reference.

The invention relates to a navigation and display system that enables TV viewers to mix-in widgets on a main TV-picture, according to the preamble of claim 1. The invention also relates to a method for providing sticky widgets to a main TV-picture, according to the preamble of claim 7.

BACKGROUND

Widgets are interactive virtual tools that typically provide single-purpose services such as showing the latest news, the current weather, the time, a calendar, a dictionary, a map program, a calculator, desktop notes, photo viewers, language translator, social network updates, or games, among other things.

The complexity of the widgets varies from display of information to more advanced interactive content.

Other terms used to describe widgets include: application, mini-application, app, applet, gadget, badge, module, Web-Kit, capsule, snippet, mini and flake. Widgets are typically in use on PCs (desktop widgets) and on mobile phones.

Most TV widgets are like the ordinary widgets, but for a TV device. The TV widgets are displayed on the sides or overlaid above the TV-picture/program/signal.

From WO 2009063441 it is known a system and method for managing widgets.

Publication EP 2069900 describes a system and method for managing and using electronic widgets.

From U.S.2009100361 it is known a system and method for providing dynamically updating applications in a television display environment.

Publication WO 2008131417 describes mobile widget dashboard and from CA 2622900 it is known self-contained mini-applications system and method for digital television.

From U.S.20080120547 it is known an apparatus and method for managing the appearance of a graphical user interface, especially for widgets.

From WO 2009063441 it is known a system and a method for managing widgets.

OBJECT

The main object of the invention is to provide a system where a TV viewer is able to navigate widgets profiles and the widgets inside the different widget profiles. It is further an object of the invention to provide a system which makes it possible for the TV viewer to select widgets from different widget profiles, and to make the selected widgets sticky and/or "sticky on change".

THE INVENTION

A system according to the invention is described in claim 1. Details and advantageous features of the system are described in claims 2-6.

A method according to the invention is described in claim 7. Details and advantageous features are described in claims 8-16.

A system according to the invention includes a TV unit, provided with an internal or external Internet-enabled device, which provides Internet to the TV unit.

The TV unit can be controlled by a control device, via which control device a TV viewer is able to navigate and interact with the TV unit. The internet-enabled device is provided with software and/or means for displaying and navigation of the system according to the invention, and an interface for communicating with the TV unit.

A TV unit may also include the control device in addition to the Internet-enabled device.

The system according to the invention is provided with means for providing one or more widgets to the display of the TV unit. The system is arranged for the TV-viewer to set up widgets profiles, which widget profiles are a collection of widgets. The widgets profiles could either be personal or categorical.

The system is arranged such that the TV-viewer can select among available widgets and widgets profiles, and have them shown at the display of the TV unit together with the normal TV-sending or other programs, videos or similar the TV-viewer desires to watch.

When used for Digital Signage the TV signal will typically be one or more playlists with videos, pictures, posters and so on displayed on the display on the TV unit. Digital Signage systems will typically support automatic switching of widgets profiles based on date, time-of-day, weather and/or other dynamic parameters.

The TV viewer can create suitable widgets profiles by adding and deleting widgets. A new widget can easily be dragged to the preferable spot in the profile. The widget profile can later be changed or deleted. The widgets and the widgets profiles can be provided with different themes with different back-grounds, text, fonts and colors based on the TV viewer's preferences.

The widgets can also be set to only appear at the display of the TV unit for a certain time when the widget has been updated, also known as alerts or notifications.

The system is of course arranged such that the TV viewer can select between normal TV and TV with widgets.

The system is preferably arranged such that the widgets profiles can be stored, that the TV-viewer can have multiple widgets profiles and that the widgets profiles can be protected by a password.

Further advantageous details and preferable features of the invention will appear from the following example description.

EXAMPLE

The invention will below be described in detail with references to the attached drawings, wherein.

Figure 1:
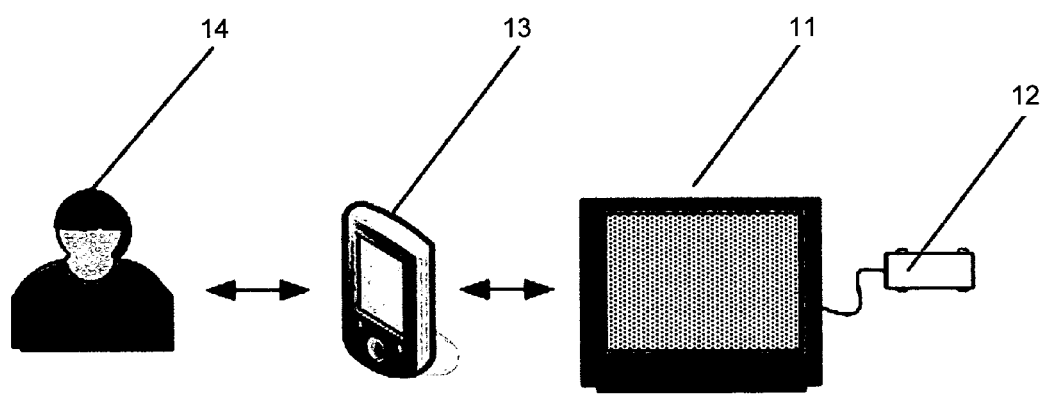
FIG. 1 is a principle drawing of a system according to the invention.

Reference is now made to FIG. 1 which is a principle drawing of a system according to the invention. A system according to the invention includes a TV unit 11, provided with an internal or external Internet-enabled device 12, which provides internet to the TV unit 11. Examples of Internet-enabled devices 12 are Blu-Ray players, set-top boxes and video game consoles that are able to connect to the Internet.

The TV unit 11 can be controlled by a control device 13, via which control device 13 a TV viewer 14 is able to navigate and interact with the TV unit 11. Examples of control devices 13 are remote controls equipped with key buttons and smart devices equipped with an optional interactive display.

The internet-enabled device 12 is further provided with software and/or means for displaying and navigation of the system, and an interface for communicating with the TV unit 11. The functionality of the control device 13 is depended on the control device 13 in use, and the buttons on the control device 13 is typically physical key buttons, keyboard buttons, or touch and Multi-Touch activated buttons and interactions.

The use of the different buttons on the control device 13 varies with the mode of the system at that specific time.

The TV unit 11 could also include the control device 13 in addition to the Internet-enabled device 12. Examples of this combination are PDAs, mobile phones, and iPhones.

A widget profile is a collection of widgets. The widgets profiles could either be personal (such as John's profile, with John's favorite widgets) or categorical (such as News or Sports, with many widgets of the same overall type). How the TV viewer 14 chooses to organize the widgets profiles is totally up to him/her.

The widgets displayed in a widget profile do not have to be in launched widget presentation mode by default. Widgets not in launched mode will typically be displayed in the same manner as the widgets are presented in the widget market; for instance with a widget icon and a widget name. Interactive widgets and widgets that do not show any live information are typical widgets that are not displayed in launched presentation mode.

TV viewer 14 has to activate the "launch-widget" widget presentation button before he can use a widget that is not launched.

The first-time-use widget profile is a profile that is loaded into the Internet-enabled device 12 when the "Internet on TV" solution is used for the first time. Typically the first-time-use profile will include widgets valid for a broader audience, with for example local news and weather.

The default widget profile is the widgets profile that is configured to be loaded when the "Internet on TV" solution is activated from the control device 13.

Widgets profiles can be password protected, for privacy reasons. This is practical when the profile includes sensitive widgets, for example a Facebook widget. The password is typically a 4-digit PIN code, which is entered using the numerical buttons on the control device 13.

TV viewers 14 can create new widgets profiles on a web portal provided to the TV-viewers. Here, they can choose the name of the profile, and which widgets which is to be included. When adding a new widget it can be dragged to the preferable spot in the profile. Here, the TV viewer 14 can also add or edit the existing widgets profiles, as well as deleting them, set a widget profile to the default profile, change or remove the widgets profiles PIN-code, and change their user account password.

On the web portal, which is accessible through the Internet-enabled device 12 or from other Internet devices, the TV viewer 14 can choose between several themes, with different back-grounds, text, fonts and colors. It is also possible to create new themes, widgets and widgets profiles, and to share them with other TV viewers 14 in a web based community.

The TV viewers 14 can also perform other actions on the web portal, such as changing the settings on their user account; adding new users and TV devices, and more.

Themes, widgets and widgets profiles can be published to the web-based community and thereby making those available for other TV viewers. The creator of the theme, widget or widget profile selects the settings and parameters that shall be available for customization in the web-based community.

Published themes, widgets and widgets profiles are customizable by the TV viewers after they have been selected from the web-based community, significantly reducing the time needed to produce personalized TV content. Example of customization includes the possibility to change font, colors, images, tags, and so on.

Because several of the sticky widgets might have completely or partially overlapping screen areas on the different widgets profiles they were selected from, they can be placed according to the TV viewer 14 preferences defined on the web portal or through the control device 13. The sticky widgets will typically start in one corner and continues in one direction. Upper left corner and down might be a good default.

The TV viewer 14 can retrieve forgotten PIN and password by e-mail without signing in to the web portal.

Figure 2:
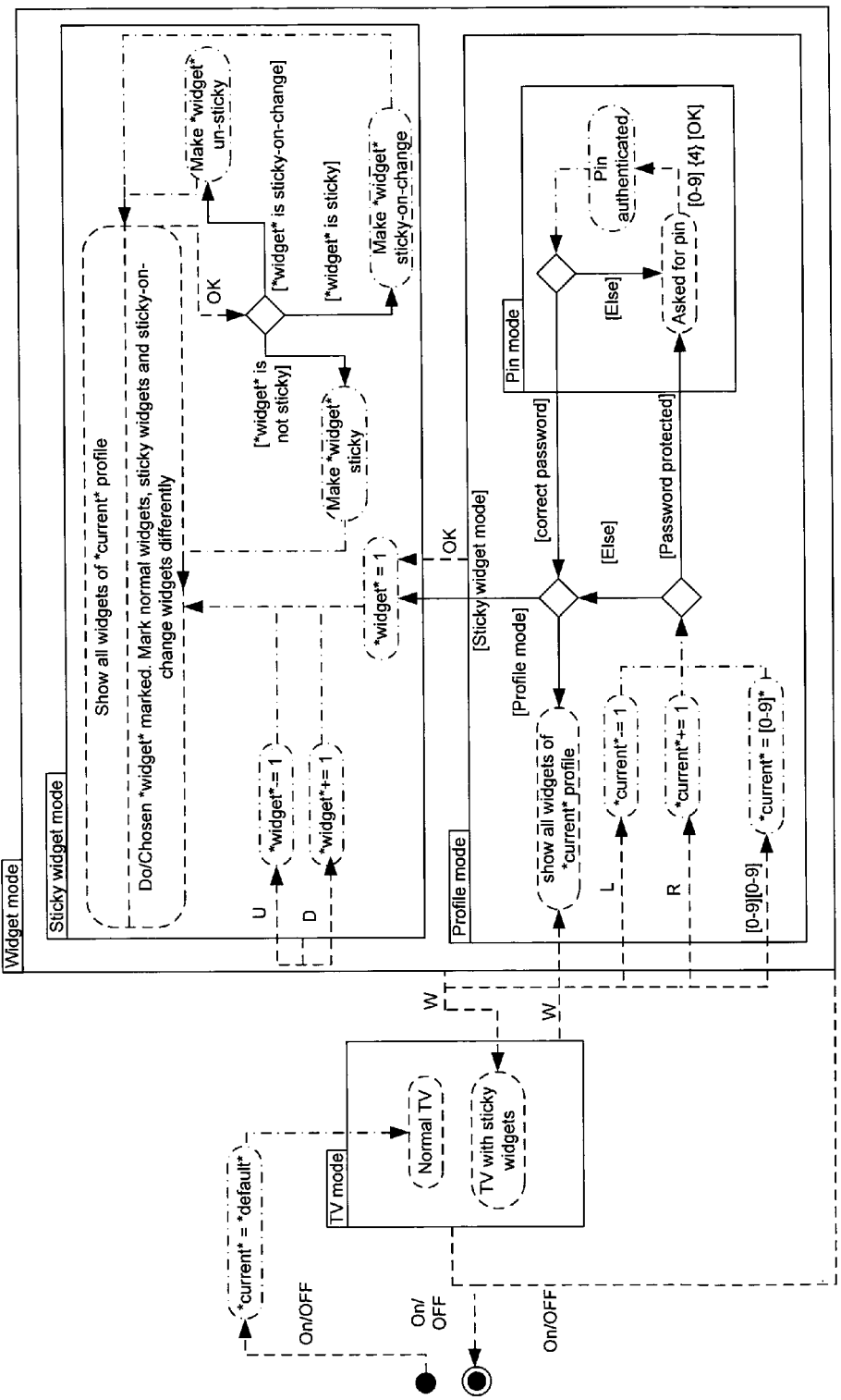
FIG. 2 is a system state diagram.

Reference is now made to FIG. 2 which shows a state diagram covering actions from the control device 13 buttons, states and modes. Here, the states and the change of state due to button pushes are marked with dotted lines. Actions and automatic state changes and others due to these actions, are marked with dotted lines in combination with dots. Branches are marked with solid lines. The buttons used in the state diagram is for illustration purposes. The arrow buttons (◄, ►, ▼, ▲) on the control device 13 are labeled L for Left, R for Right, U for Up, and D for Down.

When a TV-viewer 14 turns on the TV unit 11, the mode presented to the TV-viewer 14 is normal TV mode where the TV unit 11 works as a normal TV.

FIG. 2 also shows that there are two main modes, and three sub-modes, in which the buttons could have separate meanings. The main modes are TV mode and widget mode. Widget mode is again separated into sticky widget mode and profile mode. PIN mode is yet another sub-mode of profile mode.

The TV viewer 14 can change widget profile both in profile mode and in sticky widget mode. As the state diagram (FIG. 2) shows, the method is the same. The difference is where the TV viewer 14 brings the system afterwards. If the system is started in profile mode, the system will stay in profile mode, just showing the new profile's widgets. If the system was in sticky widget mode, however, the system will stay in this mode, showing the new profile's widgets with stickiness-marking.

Figure 3:
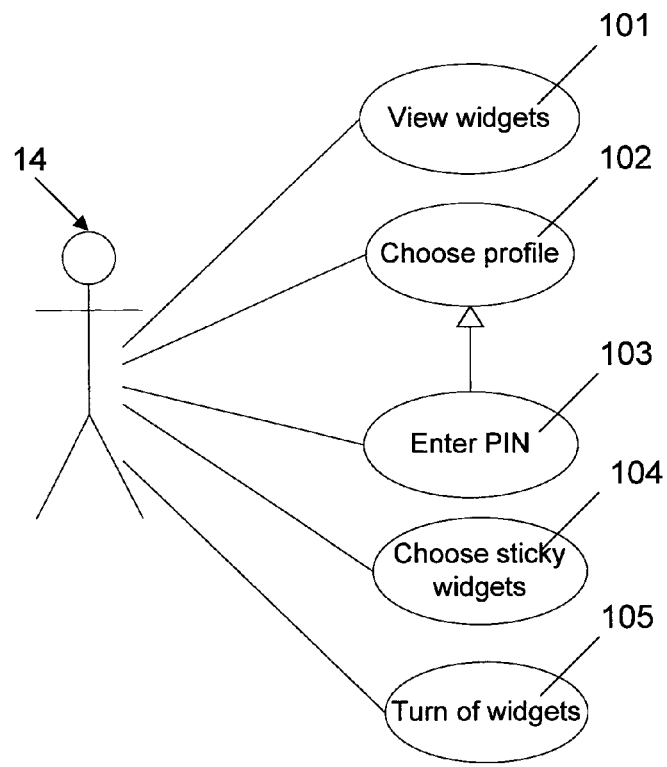
FIG. 3 is a system interaction diagram.

Reference is now made to FIG. 3 which illustrates how the TV viewer 14 is using a system according to the invention. The figure shows how the TV viewer 14 navigates and interacts with the TV unit 11 through a control device 13 and Internet-enabled device 12, and it also shows the constraints that are given by a system according to the invention.

Reference is also made to FIG. 2 that shows the system's state transitions.

The following scenario explains how the TV viewer 11 can turn on and off the widget based the system according to the invention.

When a TV viewer 14 is watching TV, he can easily activate the "Internet on TV" button on the control device 13 and the widgets in the default widget profile will appear on the display of the TV unit 11. The widgets are mixed-in on the main TV-picture. This means that the TV viewer 14 can watch TV while checking the weather, news and other stuff.

To turn off the widgets the TV viewer 14 simply activates the same button, that is the "Internet on TV" button, one more time and all the widgets disappear from the display of the TV unit 11. This is the only thing the simple TV viewer 14 needs to know.

The following scenario explains how the TV viewer 14 navigates through the different widgets profiles on the TV unit 11. The assumptions are that the TV unit 11 has at least one widget profile in addition to the default profile, and that the widgets system is turned on.

When a TV viewer 14 turns on the widget based "Internet on TV" solution he turns on the widget-mode, which means he can switch between the widgets profiles and view the profiles widgets on the display of the TV unit 11, as indicated by step 101.

The TV viewer 11 navigates the different widget profiles by activation of switch profile buttons on the control device 13, as indicated by step 102.

If the selected profile is PIN-protected the TV viewer 14 will be asked to enter the PIN code, as indicated by step 103, before he can see any of the selected profile's widgets. He uses the control device 13 to enter the PIN. If the PIN is correct the widgets from the last profile will be switched with widgets from the selected profile. If the PIN is wrong the TV viewer 14 will get an error message and another attempt to enter correct PIN. If the TV viewer 14 doesn't know or remember the PIN he can choose to navigate to a different profile.

In PIN mode numeric buttons and OK buttons are typically used to enter the PIN, and not to switch widgets profiles or modes and such.

The TV viewer 14 can also navigate widgets profiles by using the numeric buttons on the control device 13 in the same way as they are used to switch TV channel in TV mode, as indicated by step 104. Each widgets profile will have its own number, and the TV viewer 14 can jump directly to a given profile by entering the number on the numeric buttons. This is very practical given many widgets profiles, but will only work outside the PIN mode. The TV viewer can also turn of widgets and return to normal TV, as indicated by step 105.

Figure 4:
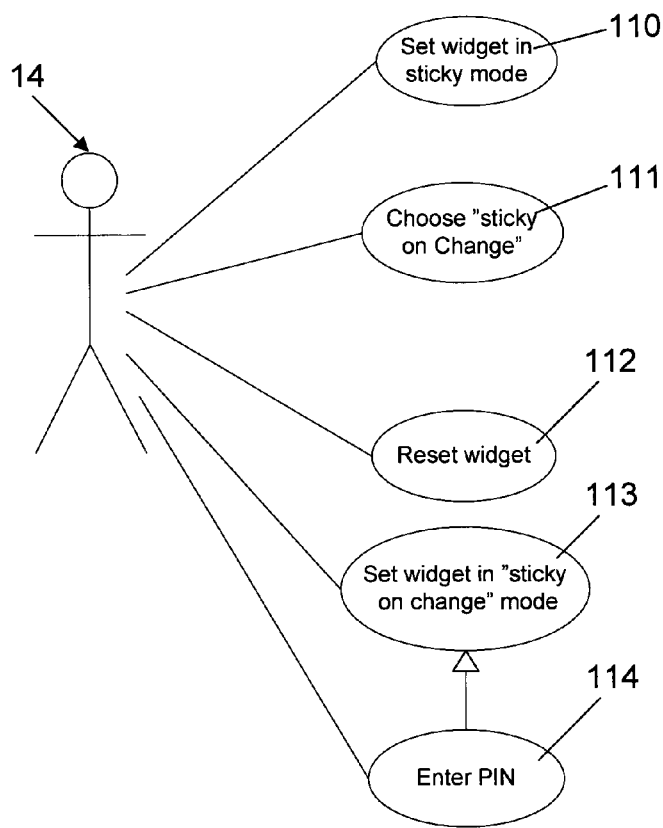
FIG. 4 is a sticky widgets interaction diagram.
Figure 5:
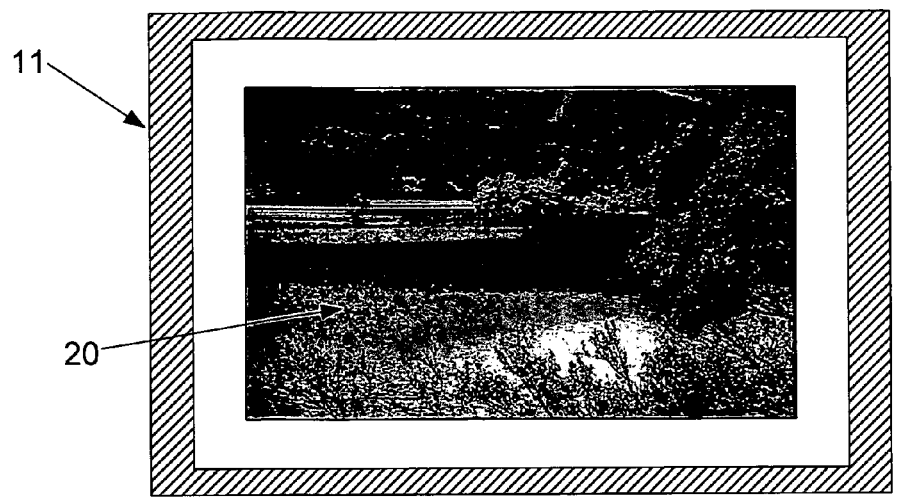
FIG. 5 shows a regular TV.

Reference is now made to FIG. 4 which illustrates how a TV viewer 14 navigates and interacts with a system according to the sticky widgets part of the invention, as indicated by step 104. Sticky widgets attach to the TV display even if the viewer 14 exits widget mode.

Reference is also made to FIG. 2 that shows the system's state transitions.

The following scenario explains how a TV viewer 14 can make one or more widgets sticky. Activation of the sticky widget mode can only be done in profile mode, as shown in FIG. 2.

The sticky widget selection buttons do not have any functionality before the TV viewer 14 activates the "sticky widgets mode" button on the control device 13, as shown in FIG. 2 where the OK-button is used for illustration purposes. Now the TV viewer 14 can use the select widgets buttons to navigate to a widget, and then set it in the desired widget presentation mode. The available widget presentation modes are depending on the design of the system.

When the preferred widget is chosen he activates the "sticky widget" presentation mode button on the control device 12 to make the widget sticky, as indicated by step 110.

To make the widget "sticky on change", as indicated by step 111, the TV viewer 14 activates the "sticky on change" presentation mode button on the control device 13. The "sticky on change" presentation mode button will only be available for widgets that support this functionality.

To make the widget not sticky again, meaning that it is not in "sticky" or "sticky on change" presentation mode, the TV viewer 14 activates the "not sticky" presentation mode button on the control device 13, as indicated by step 112.

As the functionality of the control device 13 is depended on the control device 13 in use, all the widget presentation mode buttons could be the same button, as further described below.

After making a widget sticky, "not sticky" or "sticky on change" the TV viewer 14 can easily choose more widgets as sticky, "not sticky" or "sticky on change".

If the TV viewer 14 wants to change widget presentation mode on a widget in another widget profile he can activate the switch profile buttons to navigate to the to the preferred widgets profile, as indicated by step 113 and 114, and then change widget presentation mode on the selected widget(s).

When the TV viewer 14 has selected all the sticky, "not sticky" and "sticky on change" widgets he wants, he activates the "Internet on TV" button on the control device 13, and the widgets that are not sticky will disappear while the sticky widgets will appear on the display of the TV unit 11, except for the "sticky on change" widgets which only will be visible for a while when their content is updated or changed.

If the "sticky on change" widget itself or just the widget content will appear after the content is updated or changed depends on the design and the settings of the widget. As an example a "sticky on change" football results widget might just show the actual changes in the football matches as they happens instead of showing the whole widget when it appear on the display of the TV unit 11. The widget presentation mode "sticky on change" is also known as notifications.

On simple control devices 13, the sticky widgets will be placed on the display of the TV unit 11 according to the TV viewer 14 preferences defined on the web portal. More advanced control devices 13 can include buttons that make it possible for the TV viewer 14 to place the sticky widget on the display of the TV unit 11.

If the TV viewer 14 wants different sticky widgets he can turn the TV unit 11 off and on again, or manually change stickiness on the widgets. Another option could be to turn off all widgets by activation an optional "reset all widget presentation modes" button on the control device 13.

A method according to the invention can be summarized in the following features:

- communicating with a web portal for retrieving themes, widgets and widgets profiles by means of the Internet-enabled device,
- defining of themes, widgets and widgets profiles,
- uploading of themes, widgets and widgets profiles,
- making the widgets sticky or un-sticky,
- providing the widgets on the display of the TV unit together with a normal TV-sending or other programs, videos or similar a TV-viewer desires to watch.

The method can further be summarized to include one or more of the following features:

- making the widgets "sticky on change" or "not sticky on change",
- activating normal TV or TV with widgets,
- changing and saving of themes, widgets and widgets profiles,
- password protecting widgets profiles,
- checking if a widget profile is password protected and if it is ask for password,
- checking that an entered password is correct, and if incorrect ask for password once more or resend the password to a registered email-address or send a SMS to a registered phone number, dragging and dropping the sticky widgets on a desired spot on the display of the TV unit by means of a control device, or defined through the web-portal, communicating with a web based community, and publishing themes, widgets and widgets profiles in the web based community to make them available for other TV-viewers.

Reference is now made to FIGS. 5-10 which show an example of an implementation of the system according to the invention where a regular TV remote control buttons is used.

The following keys are selected to fulfill the system purposes:

number buttons (0, 1, 2, 3, 4, 5, 6, 7, 8, 9),
arrow buttons (◄, ►, ▼, ▲),
OK-button
W button (a specified "Internet on TV" button).

Figure 6:
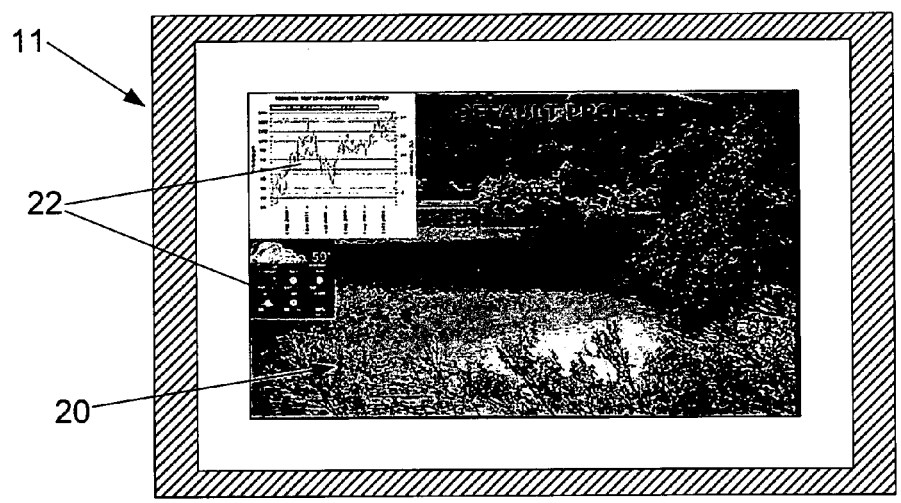
FIG. 6 shows a default widget profile displayed.
Figure 7:
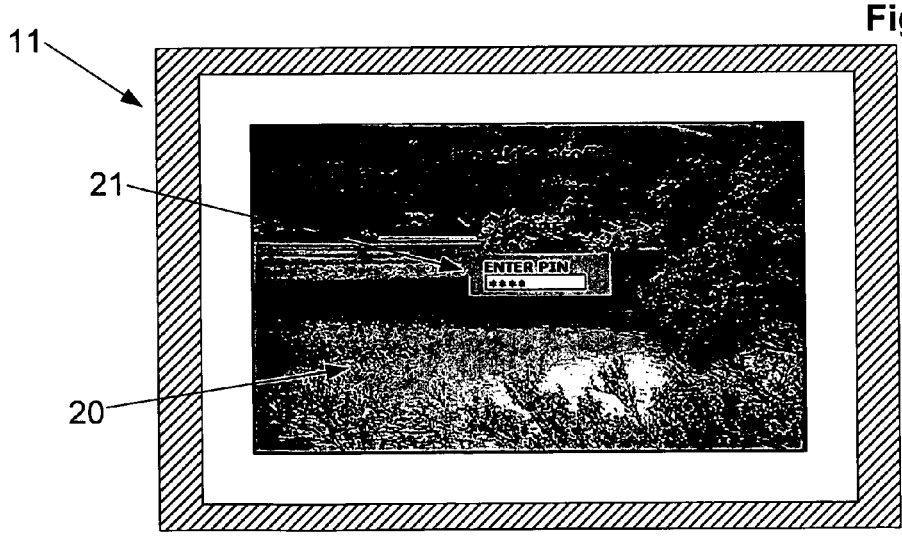
FIG. 7 shows a window "Enter PIN code" displayed.
Figure 8:
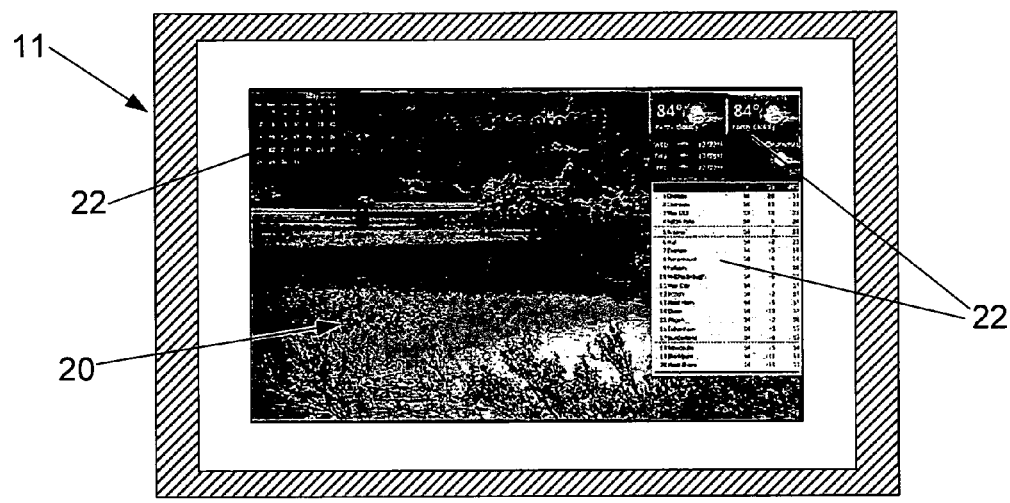
FIG. 8 shows the chosen widget profile displayed.

When first turning on the TV unit 11, there will be a normal TV show/program (FIG. 5) displayed on a display 20 of the TV unit 11. By pressing W on the control device 13, the TV viewer 14 is brought to the default widget profile (FIG. 6). Now, the arrows ◄ and ► on the control device 13 will navigate/switch to a different profile. When switching to a secured profile, the TV viewer 14 will be prompted with window 21 asking for a PIN code (FIG. 7). When entered and after pressing the OK button, the secured widget profile will load (FIG. 8), and the TV viewer 14 can enjoy the profile's widgets 22.

Figure 9:
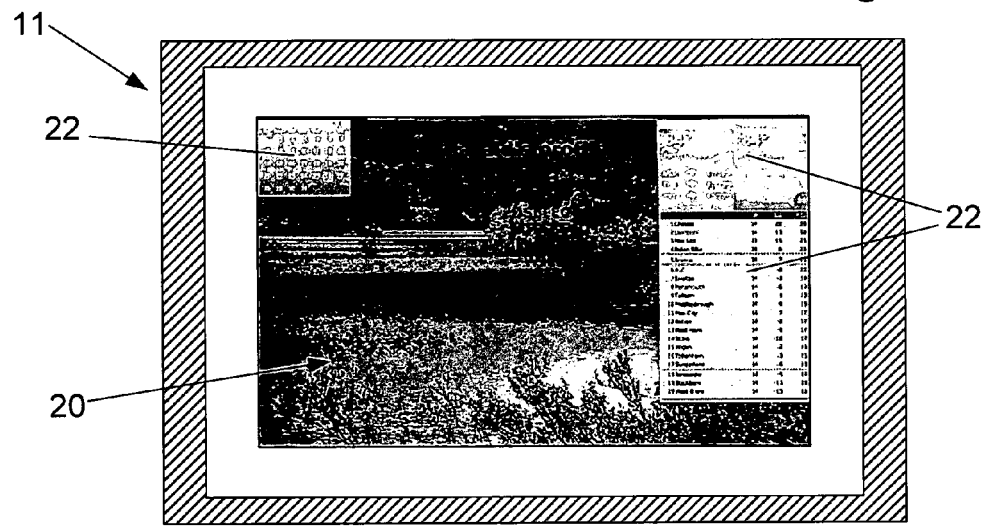
FIG. 9 shows the selected widget displayed in widget-mode.
Figure 10:
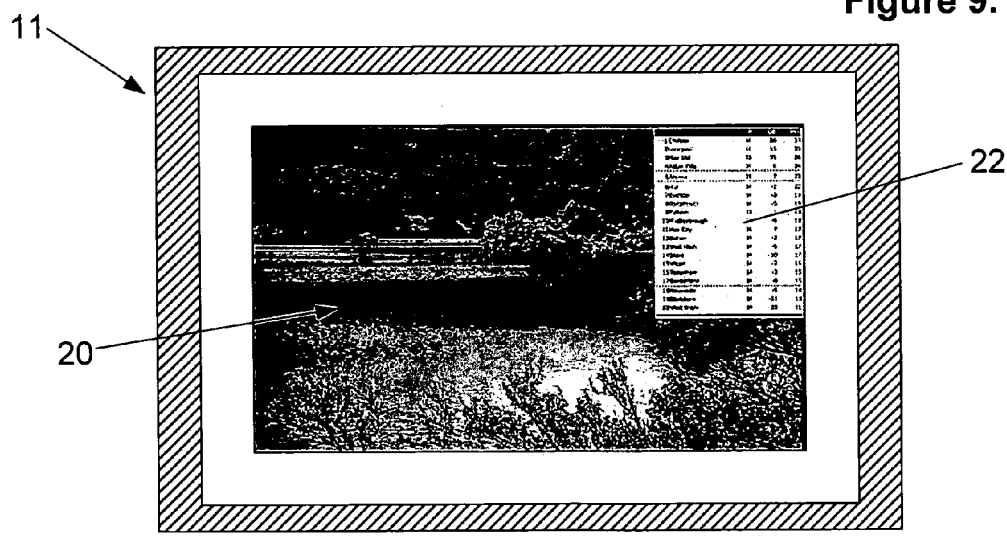
FIG. 10 shows the selected sticky widgets displayed in TV mode.

By pressing OK, or the up/down arrow buttons (▼, ▲), on the control device 13, the TV viewer 14 will enter sticky widget mode, and all except one widget 22 will be faded out (FIG. 9). The buttons ▼ and ▲ on the control device 13 will navigate/switch which widget 22 that is selected. By pressing OK, the selected widget 22 will be made sticky. To make the widget 22 "sticky on change" the TV viewer 14 simply presses the OK-button one more time. To make the widget 22 not sticky again the TV viewer 14 presses the OK-button a third time and is returned to where he started before making the widget 22 sticky. By pressing OK, the selected widget 22 will once again be made sticky. After pressing W again, the TV viewer 14 is back in TV mode, with the sticky widget 22 still visible (FIG. 10).

The TV viewer 14 can turn off all widgets by pressing and holding down W on the control device 13 for a few seconds, or by turning off the TV unit 11.

MODIFICATIONS

The method and system may be provided to provide the TV-viewer with a sound signal as "sticky on change" widgets updates are shown on the display of the TV unit.

The method and system may include automatic widgets and advertisement searches based on the TV viewer interests and his use of widgets.

The invention claimed is:

1. A system for providing widgets on a display of a TV unit provided with an internal or external Internet-enabled device which provides Internet to the TV unit, the system comprising:
    an internal or external control device for controlling the TV unit;
    wherein the Internet-enabled device is configured to provide navigation, presentation, and use of widgets on the display of the TV unit together with a normal TV-sending, other programs, or videos, that a user desires to watch, wherein the Internet-enabled device is arranged for managing widgets modes for:
        "sticky on change" wherein the widget's notifications for off-screen widgets appear on the display of the TV unit for a certain time when their content has been updated or changed; and
        "sticky", wherein the widget remains on the display of the TV unit when the user exits the widget mode.

2. The system according to claim 1, wherein the Internet-enabled device includes at least one member selected from the group consisting of:
    an interface for communicating with the TV unit;
    software and/or means for controlling, displaying, using and navigating widgets on the display of the TV unit; and
    software and/or means for security, including password protection of widgets profiles.

3. The system according to claim 1, wherein the Internet-enabled device is configured for one or more of:
    communicating with a web portal for retrieving available widgets, themes and widget profiles;
    communicating with the control device via the TV unit; and
    setting up, changing, deleting, storing and/or uploading themes, widgets, and widgets profiles.

4. The system according to claim 1, wherein the widgets are arranged to be dragged and dropped at a desired spot on the display of the TV unit by means of the control device, or defined through a web portal.

5. A system according to claim 1, wherein the widgets can be provided with desired backgrounds, fonts, tags, or colors.

6. A method for providing widgets on a display of a TV unit provided with an internal or external Internet-enabled device, wherein the method comprises the steps of:
    communicating with a web portal for retrieving themes, widgets and widgets profiles by means of the Internet-enabled device;
    defining of themes, widgets and widgets profiles;
    uploading of themes, widgets and widgets profiles;
    providing the widgets on the display of the TV unit together with a normal TV-sending, other programs, or videos that a TV-viewer desires to watch;
    navigating widgets and widgets profiles;
    wherein the method further includes managing widgets modes for:
        "sticky on change" wherein the widget's notifications for off-screen widgets appear on the display of the TV unit for a certain time when their content has been updated or changed; and
        "sticky", wherein the widget remains on the display of the TV unit when the user exits the widget mode.

7. The method according to claim 6, comprising activating normal TV or TV with widgets.

8. The method according to claim 6, further comprising changing and saving themes, widgets profiles, and/or password protecting profiles.

9. The method according to claim 6, comprising checking if a widget profile is password protected, and asking for a password if the profile is password protected.

10. The method according to claim 9, comprising checking that an entered password is correct, and, if incorrect, asking for the password once more, or resending the password to a registered e-mail address, or sending an SMS to a registered phone number.

11. The method according to claim 6, comprising dragging and dropping the widgets at a desired spot on the display of the digital TV unit by means of a control device, or defined through the web-portal.

12. The method according to claim 6, comprising communicating with a web-based community.

13. The method according to claim 12, comprising publishing themes, widgets and widgets profiles in the web-based community.

* * * * *